March 9, 1971  T. LUNDEN ET AL  3,568,284
CUTTING TOOLS

Filed April 8, 1968  4 Sheets-Sheet 1

INVENTORS:
TORE LUNDÉN + CARL VICKTOR ÅSTRAND
by
Browne, Schuyler + Beveridge,
Attorneys INVENTORS:
TORE LUNDÉN &
CARL VICTOR ÅSTRAND
by
Browne, Schuyler + Beveridge,
Attorneys March 9, 1971 T. LUNDEN ET AL 3,568,284
CUTTING TOOLS
Filed April 8, 1968 4 Sheets-Sheet 4
FIG. 6
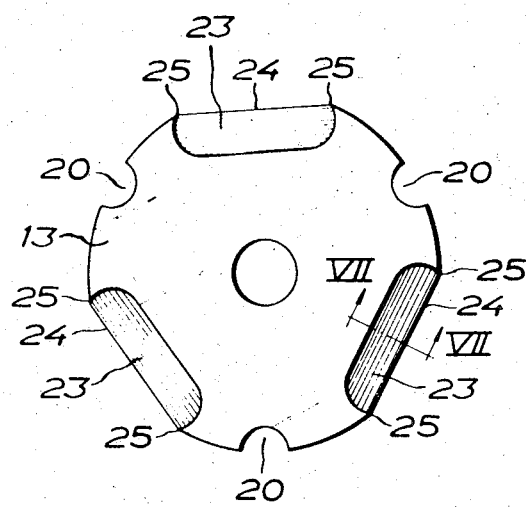
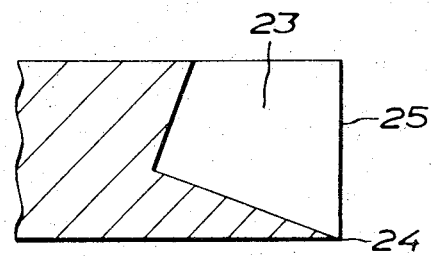
FIG. 7
INVENTORS:
TORE LUNDÉN & CARL VICKTOR ÅSTRAND
by
Browne, Schuyler + Beveridge,
Attorneys United States Patent Office 3,568,284
Patented Mar. 9, 1971

3,568,284
CUTTING TOOLS
Tore Lunden, Knislinge, and Carl Astrand, Hanaskog,
Sweden, assignors to Tarkett AB, Malmo, Sweden
Filed Apr. 8, 1968, Ser. No. 719,601
Claims priority, application Sweden, Apr. 10, 1967,
4,931/67; Nov. 29, 1967, 16,365/67
Int. Cl. B26d 1/00, 1/12
U.S. Cl. 29—105                                11 Claims

ABSTRACT OF THE DISCLOSURE

A cutting tool comprises one or more disk-shaped body members secured to a drive shaft and having recesses that intersect the body member periphery and each accommodates a cutting element which substantially lies within the space defined by the lateral planes of the associated body member, said cutting element projecting with a minor portion of its periphery beyond that of the body member and having on said projecting portion one or more cutting edges which can be exchanged for other cutting edges of the cutting element by rotation of the element in said recess and by fixation thereof in the angular position into which it has been set.

---

This invention relates to a cutting tool.

In various cutting procedures, particularly lathe tooling and milling, it is now customary to use tools comprising hard metal cutting elements reversibly or rotatably inserted in a body member. This, of course, results in considerably longer intervals between the tool changes necessitated by the wear of the cutting edges and thereby reduces the standstill periods of the machines.

The invention has for its object to provide a tool for all kinds of cutting procedures, which can be used without exchange of the cutting elements for still longer periods than prior-art tools having indexable cutting elements, said tool further comprising parts that readily permit combining for the manufacture of for instance various kinds of profiles. The tool is also very safe in point of labour protection.

More particularly the tool suggested by the present invention comprises preferably disk-shaped body members which are detachably secured to a drive shaft, and at least one of said body members at its periphery has recesses for accommodating cutting elements having the form of means which are rotatable in a plane parallel with the lateral planes of the disk-shaped body member and which can be fixed in the angular position into which they have been set, said means projecting with but a small part of their periphery beyond the peripheral surface of the body member and lying wholly or substantially within the space defined by the lateral planes of the disk-shaped body member.

For better elucidation, the invention will be more fully described in the following with reference to the accompanying drawings which illustrate some embodiments of the cutting tool.

In the drawings:

FIGS. 2–6 are side views of various cutting elements for the tool;

FIG. 7 is a section on line VII—VII in FIG. 6;

Figure 1:
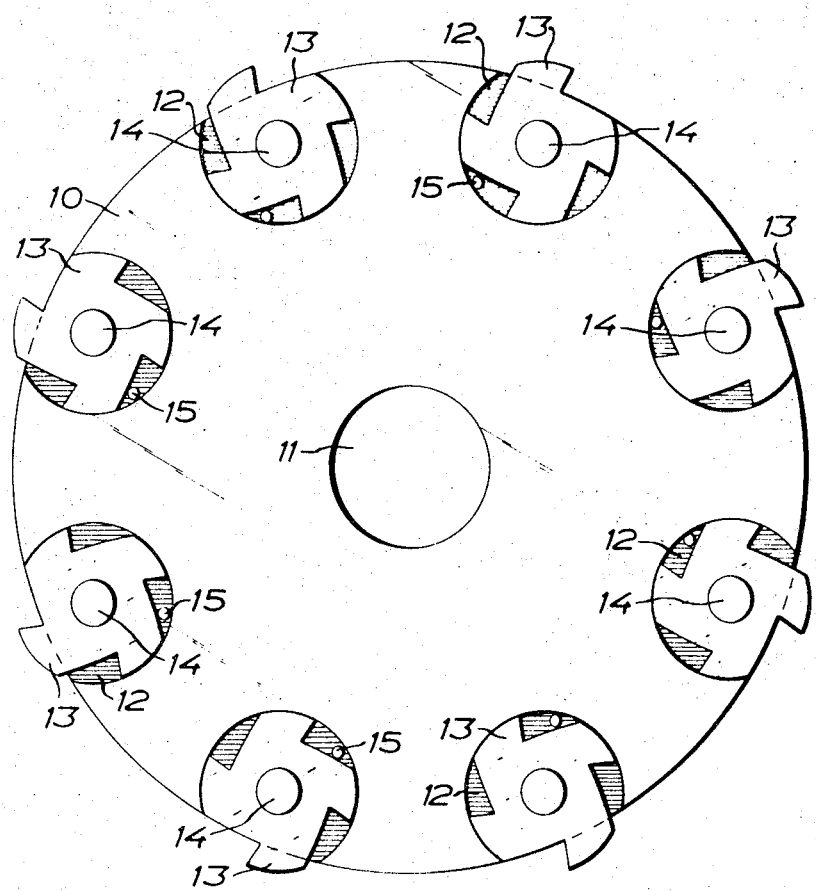
FIG. 1 is a side view of a disk-shaped body member having cutting elements inserted therein to provide a tool in accordance with the invention.

The disk-shaped body member 10 shown in FIG. 1 for the tool of the invention is flat and circular and has a central hole 11 for securing the body member to a drive shaft as well as a plurality of circular recesses 12 spaced from the periphery of the member a distance slightly smaller than the radii of the recesses. The recesses 12 are meant to receive cutting elements 13 which are described more in detail in the following and which project with part of their periphery beyond the periphery of the body member 10. The cutting elements 13 are rotatably mounted with the aid of a shaft 14 and are prevented from rotating by means of a lock pin 15. The shafts 14 are suitably secured in the body member 10 but can also project somewhat from the upper boundary surface of the member to be received in the corresponding holes in a second disk-shaped body member (not shown), placed on top of the body member 10 in FIG. 1 for fixation thereto so that the cutting elements 13 are enclosed between the two body members. The recesses 12 are here shown as presenting a bottom but can also extend throughout the body member 10, the side faces of the cutting elements 13 being then situated in the same planes as the side faces of the body member 10 and being kept in position by means of a pin engaging a groove in the wall of the recess and a corresponding groove in the periphery of the cutting element. Likewise, the lock pin 15 is preferably received only in a corresponding bore in the body member 10, but particularly when considerable stresses are expected it can also lie in bores in both members. The cutting elements 13 need not necessarily be locked with the aid of the lock pin 15 but can also be kept in position by clamping or wedge action between the two body members. In the latter case preferably half of the recess is provided in each member and the recess halves are of a depth diminishing towards the periphery of the body member. Although it does not appear from FIG. 1 the body member 10 may have recesses 12 in its two flat side faces in which case the recesses in one side should preferably not be arranged in register with those in the other side but in such a way that the recesses in one side will come to lie midway between those in the other side. Likewise, the recesses 12 may of course extend throughout the body member 10.

Figure 2:
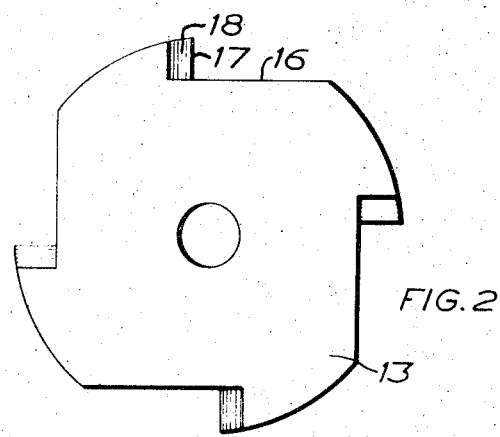
Figure 3:
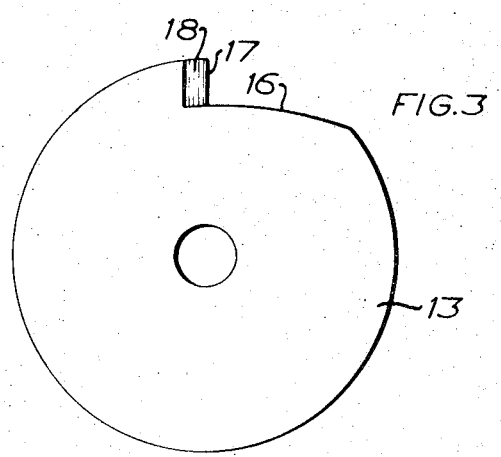
Figure 4:
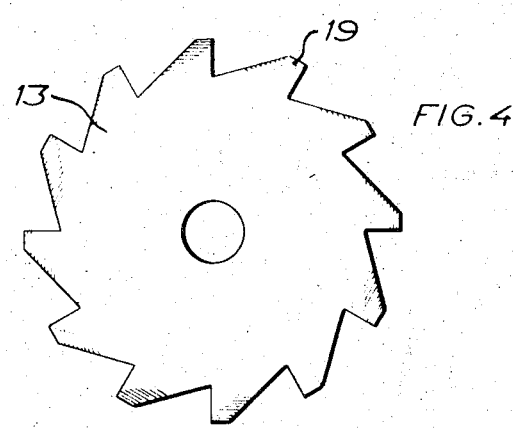

FIGS. 2–4 illustrate some cutting elements 13 of various types for use with the disk-shaped body member shown in FIG. 1. The cutting element shown in FIG. 2 is a circular disk having a central hole for receiving the shaft 14, and peripheral recesses defined by two lines 16 and 17, one line 16 extending along part of a chord and the other 17 making a right angle with the first mentioned line, the cutting edge 18 of the cutting element being formed along the latter line. Said cutting element is preferably mounted in the tool in the manner shown in FIG. 1 and it will be realized that when the first cutting edge has been worn out the lock pin 15 is withdrawn so that the next cutting edge can be brought into operating position whereupon the lock pin is reinserted. In this way, the tool shown in FIG. 1 will constantly have the same diameter, and so all time-consuming control measurements will be dispensed with.

The cutting element illustrated in FIG. 3 is of another type and has but one recess which is defined by a line 16 having a curvature corresponding to that of the periphery of the disk-shaped body member 10. Line 17 is radially oriented and has the cutting edge 18 formed along it. As distinguished from the earlier described cutting element, the cutting element in FIG. 3 is intended to be infinitely advanced, say by some tenths of a millimetre at a time, and to be sharpened without being removed from the body member 10. In this case also, the diameter of the tool is maintained constant. The cutting element shown in FIG. 3 is retained between the body member 10 and the overlying body member by wedge action or by suitable clamping.

FIG. 4 shows a saw-toothed cutting element which— though it has the same size in the drawing as the cutting elements in FIGS. 2 and 3—usually is somewhat larger than these. The saw teeth 19 of the cutting element shown in FIG. 4 are ground or sharpened in a conventional manner but they are not set. Instead, the cutting element is ground in such manner that its thickness diminishes towards the centre, whereby a suitable clearance is obtained in working. If a tool as shown in FIG. 1 is equipped with a number of saw blades of the type illustrated in FIG. 4 one obtains a tool of the circular saw blade type but of a considerably higher rigidity than a conventional circular saw blade. With the use of such a tool it is possible to perform very thin cuts in wood or like material, say of the order of one millimetre. A considerable advantage of this kind of tool is that the otherwise necessary setting of the teeth which requires many checkings to be made after sharpening is dispensed with. Such checkings have to be made with the tool in position after the blade has been mounted in the machine, with resultant time losses. It will readily be seen that with the use of saw blades of the type now described the machine need only be stopped for the time required for advancing the cutting element having the saw teeth, and after the cutting elements are worn out it is only necessary to insert new such cutting elements or to replace the tool. There is no need to make any checkings of the saw blade in the machine. The cutting element shown in FIG. 4 is preferably retained in the body member in that the recesses receiving the cutting elements conform to the taper of the cutting elements towards their centres.

Figure 5:
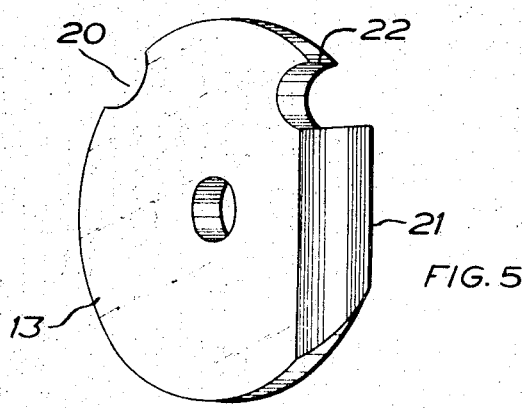

The cutting element 13 illustrated in FIG. 5 is circular and has a central hole. The periphery of the cutting element is all-beveled along a chord for forming a cutting edge 21 situated in one lateral plane of the cutting element. Adjacent the trailing end of said cutting edge 21 with regard to the intended direction of motion said cutting element has an axial bore intersecting the periphery of the element and forming a second cutting edge 22 which extends substantially along a generatrix. At another point the cutting element 13 has a semi-circular notch 20 to permit non-rotatable fixation of the cutting element in the manner earlier described. Although but one pair of cutting edges 21, 22 are shown in FIG. 5 it is understood that several such pairs may be arranged around the periphery of the cutting element.

FIG. 6 shows a cutting element 13 having two cutting edges 24, 25 which correspond to the cutting edges 21 and 22, respectively, in FIG. 5 and are formed by an elongated recess 23 which has almost semi-circular ends and intersects the periphery of the cutting element. As will appear from FIG. 7 the recess 23 is of a depth increasing towards the periphery of the element in order to form with the opposite side of the element the cutting edge 24 which extends along a chord. The cutting edge 24 is formed with the aid of the semi-circular end of the recess 23, and a particular advantage of this embodiment is that a corresponding cutting edge is formed at the opposite end of the recess 23, for which reason the cutting element will have practically twice as long a life as the cutting element in FIG. 5. In practice the cutting edges 24, 25 like the cutting edge 22 in FIG. 5 are slightly oblique in relation to a generatrix to facilitate penetration of the cutting edge into the material. The cutting element 13 is provided with notches 20 to permit fixation thereof in a disk-shaped body member.

Figure 8:
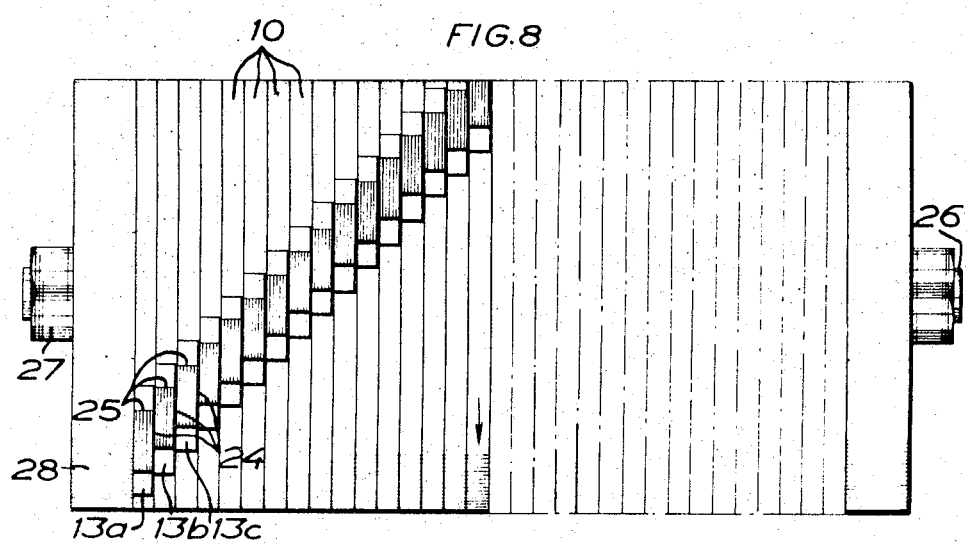
FIG. 8 is a view of a complete tool for a given cutting procedure.

FIG. 8 shows a tool in the form of a roll which is composed of a number of disk-shaped body members 10 with cutting elements of the type shown in FIGS. 6 and 7. The body members 10 have the same thickness as the cutting elements 13. In one or more circular recesses in each of the body members 10 is disposed a cutting element 13 in such a way that the cutting edges 24, 25 project to a suitable extent beyond the periphery of the body member. The cutting elements are held non-rotatable in their recesses in the body members by means of lock pins (not shown) which project on one hand into the notches 20 in the cutting element and on the other into corresponding grooves in the periphery of the recesses accommodating the cutting elements. The body members 10 are in turn rotatably mounted on a shaft 26 and can be secured by clamping action between clamping disks 28 with the aid of nuts 27. Prior to clamping the body members 10 are adjustable so that upon rotation of the roll formed by the body members 10 the cutting elements are advanced in the desired order towards a workpiece 28. Cutting elements are shown in FIG. 8 suitably mounted for the preparation of granules. In operation the cutting edge 24 of the cutting element 13a to the far left is first brought in contact with the web of material and makes a cut longitudinally of the web, and then the cutting edge 25 of the same cutting element cuts transversely of the web, severing the piece of the web defined by the outer edge of the web and said cut, whereupon the edge 24 of the cutting element 13b makes a cut in the web while the edge 25 of the cutting element severs the piece of the web situated between the former cut and the new cut, etc.

It clearly appears from FIG. 8 that by assembly of body members 10 on a drive shaft it is extremely easy to provide cutting tools of various kinds, for instance for planing, sawing and milling. The body members 10 may have different widths, and cutting elements 13 of the types shown in FIGS. 2–6 and having the desired edge contours can be used simultaneously for realizing also extremely complicated profiles. If part of the profile shall have another shape it is only necessary to exchange one or more of the body members 10. The cutting elements are preferably manufactured from hard metal and when one cutting edge has been worn out a sharp cutting edge can easily be turned into operative position, which contributes to a high running economy. Finally the cutting elements are secured in such a way that there is no risk of their getting loose.

While the invention has been described above with reference to the embodiments illustrated those skilled in the art will readily realize that the invention is not limited to this very embodiment but can be modified within the scope of the appended claims.

What we claim and desire to secure by Letters Patent is:

1. A cutting tool comprising in combination; a shaft, a disk-shaped body member secured to said shaft and having a recess intersecting its periphery, a cutting element rotatably mounted in the recess of the body member in a plane parallel with the lateral planes of the body member, said cutting element projecting with a portion of its periphery beyond that of the body member and lying substantially within the space defined by the lateral planes of the body member, and means fixing the cutting element in a set angular position, said cutting element having two cutting edges including a first cutting edge extending in the direction of the contemplated cutting movement of the body member and a second cutting edge extending at an angle with respect to said first cutting edge and to trail said first cutting edge in the direction of the cutting movement during use of the cutting tool.

2. A cutting tool as claimed in claim 1 wherein said cutting element is a generally circular disk having a bevel extending chordally at the periphery thereof to define said first cutting edge at the extremity of the bevel on the periphery of the disk, said second cutting edge being formed by the bevel at one end of the bevel.

3. A cutting tool as claimed in claim 1, in which the cutting element is in the form of a circular disk, the first cutting edge extending along a chord and the second cutting edge extending along a generatrix.

4. A cutting tool as claimed in claim 3 wherein said disk has a bevel extending chordally at the periphery of said disk, said first cutting edge being constituted by the extremity of said bevel at the periphery of said disk, and wherein said disk has a recess extending transversely through the plane of the disk at and intersecting the periphery of the disk to define said second cutting edge.

5. A cutting tool comprising in combination a drive shaft, disk-shaped body members which are detachably secured to the drive shaft in coaxial relationship, means for clamping the body members on said drive shaft, cutting elements in each of the body members, said cutting elements being rotatably arranged in recesses in the body member, which intersect the periphery of the associated body member so that the cutting elements in the respective recesses project with a peripheral portion beyond the periphery of the body member, means for fixation of the cutting elements in the angular position into which they have been set, each said cutting element lying within the space defined by the lateral planes of the associated body member and having on its portion projecting beyond the periphery of the body member a first cutting edge extending in a plane parallel with the lateral planes of the associated body member, and a second cutting edge making an angle with said first cutting edge.

6. A cutting tool as claimed in claim 5, in which the recesses in the body members are through recesses and the cutting elements have the same thickness as the body members.

7. A cutting tool as claimed in claim 5, in which said means for fixation of the cutting elements in the angular position into which they have been set comprises a pin engaging the wall of the recess and the associated cutting element.

8. A rotary disk-like cutting element having a bevel extending chordally along a peripheral portion thereof, said bevel portion narrowing outwardly of the cutting element to define a first cutting edge extending chordally along said peripheral portion, said element having a second cutting edge extending at the periphery thereof adjacent and at an angle to said first cutting edge and intersecting the plane of said cutting element, said second cutting edge being formed by a recess in one face of said cutting element at the periphery thereof.

9. The cutting element defined in claim 8 wherein said bevel and said recess merge into each other on said one face of said cutting element.

10. The cutting element defined in claim 9 including a plurality of angularly spaced bevels and recesses around the periphery of the cutting element defining a plurality of pairs of said first and second cutting edges.

11. The cutting element defined in claim 8 wherein said recess extends completely through said cutting element between both faces of said cutting element.

References Cited
UNITED STATES PATENTS

| | | | |
|---|---|---|---|
| 417,776 | 12/1889 | Eynon | 29—105 |
| 589,905 | 9/1897 | Mattison | 29—105X |
| 909,401 | 12/1909 | Haber | 29—105X |
| 1,109,321 | 9/1914 | Charles | 29—105X |
| 1,415,339 | 5/1922 | Hall | 29—105 |
| 1,432,580 | 10/1922 | Vauclain | 29—105 |
| 2,689,394 | 9/1954 | Bentjens | 29—105 |
| 3,107,413 | 10/1963 | Ohlinger | 29—105 |

HARRISON L. HINSON, Primary Examiner

U.S. Cl. X.R.

29—95, 102